United States Patent [19]

Carota et al.

[11] 4,349,718
[45] Sep. 14, 1982

[54] INSTALLATION FOR THE RESISTANCE-WELDING OF STRUCTURAL PARTS

[75] Inventors: Martin Carota, Neugermering; Josef Slootz, Eching; Klaus Weiser, Kottgeisering; Peter Gulich, Puchheim; Milenko Jovanovic, Augsburg, all of Fed. Rep. of Germany

[73] Assignee: Bayerische Motoren Werke A.G., Munich, Fed. Rep. of Germany

[21] Appl. No.: 897,391

[22] Filed: Apr. 18, 1978

[30] Foreign Application Priority Data

Apr. 20, 1977 [DE] Fed. Rep. of Germany ....... 2717453

[51] Int. Cl.³ ............................................. B23K 11/10
[52] U.S. Cl. .................................... 219/78.01; 219/87; 219/88; 219/90

[58] Field of Search ................ 219/78.01, 90, 88, 108, 219/87

[56] References Cited

U.S. PATENT DOCUMENTS

| | | | |
|---|---|---|---|
| 2,286,980 | 6/1942 | Schanz | 219/87 |
| 2,323,696 | 7/1943 | Weightman | 219/87 |
| 2,486,319 | 10/1949 | Opitz | 219/87 |
| 2,519,614 | 8/1950 | Eck | 219/88 |
| 3,128,367 | 4/1964 | Darmon | 219/87 X |
| 3,396,261 | 8/1968 | Kirsch | 219/90 |
| 3,920,950 | 11/1975 | Caprioglio | 219/90 X |

*Primary Examiner*—Richard R. Kucia
*Attorney, Agent, or Firm*—Craig and Antonelli

[57] ABSTRACT

An installation for resistance-welding of structural parts, especially in the automotive industry, with a half-tong that is pivotal about an axis and longitudinally displaceable; the half-tong supporting thereon the welding electrode is pivotal about all three coordinate axes.

28 Claims, 4 Drawing Figures

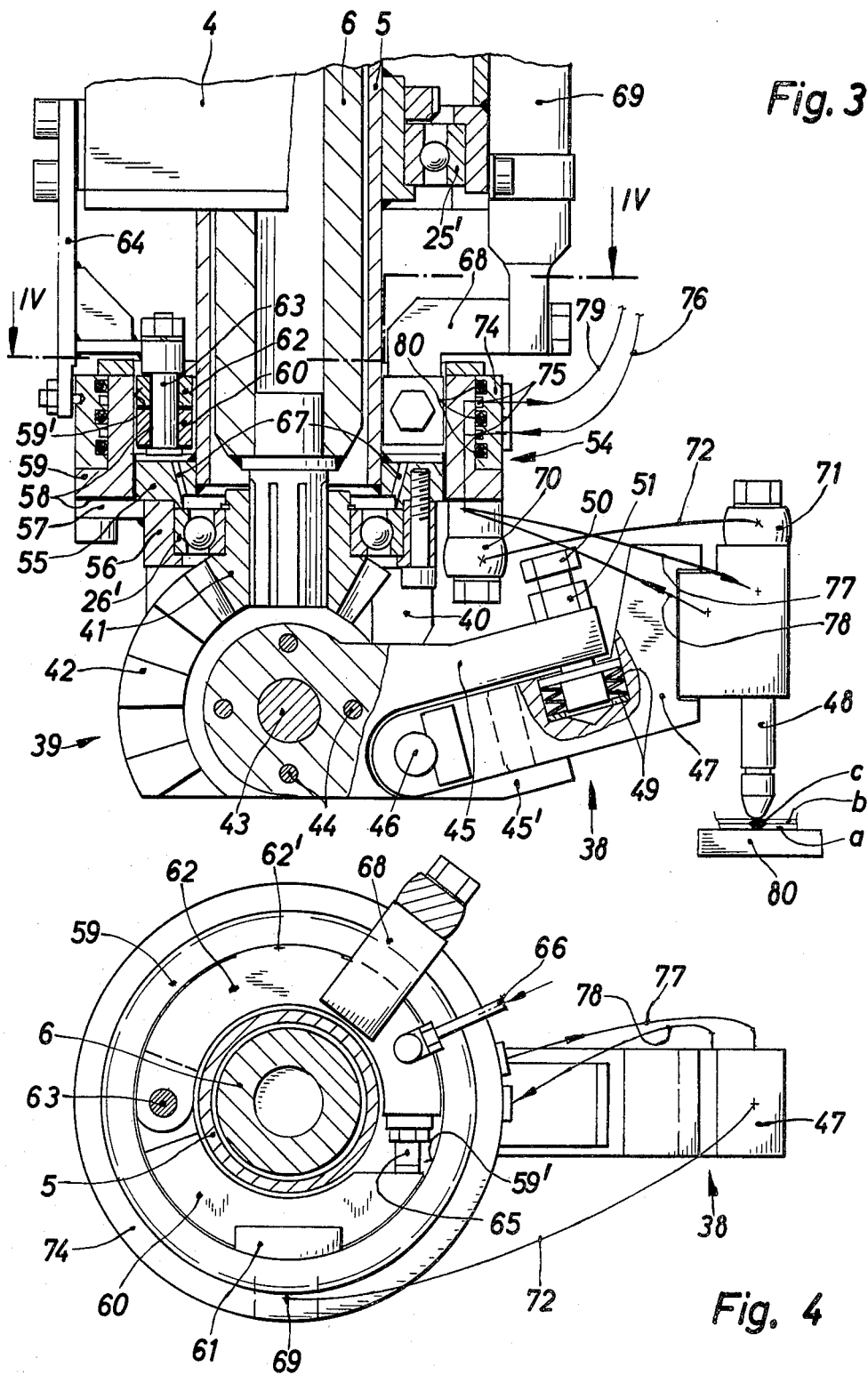

INSTALLATION FOR THE RESISTANCE-WELDING OF STRUCTURAL PARTS

The present invention relates to an installation for the resistance-welding of structural parts, especially of vehicle structural groups, with a half-tong pivotal about an axis and longitudinally displaceable, on which a welding electrode is secured.

Self-supporting vehicle bodies and the sub-structural groups thereof consist respectively of suitably formed sheet-metal parts that are connected by resistance-welding. Manually actuatable welding tongs and especially automatically operating multi-point welding installations having several stations, as well as welding lines with programmable, fully automatic handling machines and with flanged-on welding tongs serve for that purpose. By reason of the slight working range of the welding tongs, such installations can be utilized only to a limited extent for the resistance welding of large-surface structural parts which are frequently present in the vehicle body.

Half-tongs are also known in the prior art which are pivotally connected at a longitudinal displaceable support bracket and which rigidly carry at their free ends the welding electrode. The welding pressure necessary for the sheet-metal members lying on a copper plate and to be welded together is provided by a pressure cylinder which is pivotally connected, on the one hand, at the support bracket and, on the other, at the half-tong. Since the support bracket is movable exclusively in one coordinate direction and the welding electrode is rigidly connected with the half-tong, a series of points can be welded by means of this installation which lie only in a single plane.

It is the aim of the present invention to provide a resistance welding installation utilizable as universally as possible, by means of which sheet-metal parts can be welded together independently of their shape and of the location of the welding points.

The underlying problems are solved according to the present invention in that the half-tong is pivotal about all three coordinate axes.

The pressure required for the welding, which is applied by the half-tong driven by an electric motor, as also the welding output can be matched in an advantageous manner directly to the changing sheet metal parts or to other factors influencing the welding operation. The clamps and hold-down members necessary for the fastening of the structural parts to be welded together can also be travelled about without larger detours and the respective welding places can thus be reached better. A considerable gain in space is attained by the type of construction of the welding mechanism in accordance with the present invention, which is of significance especially for repair and maintenance work. Furthermore, advantageously a d.c. (direct-current) welding is applicable with the welding installation of the present invention, which produces comparatively small secondary inductive losses with sheet metal parts of large surface. Finally, only relatively small investment costs result from an enlargement of an already existing welding installation because the welding installation according to the present invention can be expanded in a rational manner according to the building-block principle.

In realization of the present invention, there is provided a pivotal and longitudinally displaceably supported mounting unit, a tubular support member rotatably supported in the mounting unit, at the end of which the half-tong is pivotally supported, a drive shaft rotatably supported in the tubular support member which as also the tubular support member includes a rotary drive and which pivots the half-tong supported at the end of the tubular member.

Accordingly, it is an object of the present invention to provide an installation for the resistance welding of structural parts, especially for the automotive industry, which avoids by simple means the aforementioned shortcomings and drawbacks encountered in the prior art.

Another object of the present invention resides in a resistance welding installation which can be used relatively universally, especially also for the resistance welding of structural parts having relatively large areas.

A further object of the present invention resides in a resistance welding installation, by means of which sheet-metal parts can be readily welded together irrespective of their shape and of the location of the welding points.

Still another object of the present invention resides in a resistance-welding installation, in which the pressure necessary for welding as well as the welding power output can be advantageously matched to the parts to be welded together as well as to other factors influencing the welding operation.

Another object of the present invention resides in an installation for the resistance welding of relatively large structural parts of any given shape, which permits the realization of a considerable gain in the spatial requirements therefor and which minimizes secondary inductive losses even with large-area sheet-metal parts.

A further object of the present invention resides in an installation for the resistance welding of structural parts which can be economically expanded, if necessary, without large investment expenditures.

These and further objects, features and advantages of the present invention will become more apparent from the following description when taken in connection with the accompanying drawing which shows, for purposes of illustration only, one embodiment in accordance with the present invention, and wherein:

FIG. 3 is a partial cross-sectional view through the lower end area of the mounting unit together with the pivot drive of the welding electrode of the resistance welding installation in accordance with the present invention; and FIG. 4 is a cross-sectional view taken along line IV—IV in FIG. 3.

Figure 1:
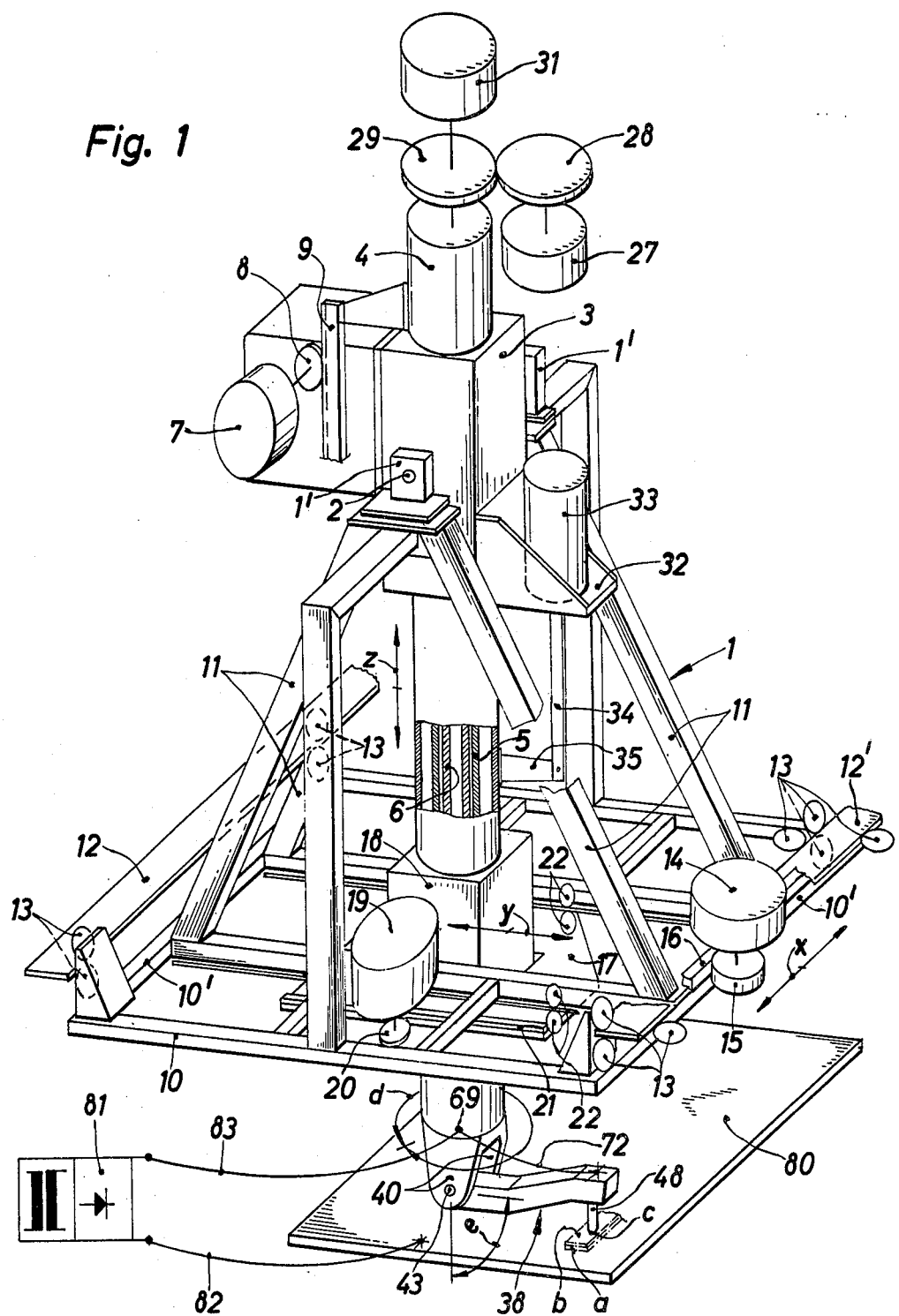
FIG. 1 is a somewhat schematic perspective view of a resistance welding installation according to the present invention.
Figure 2:
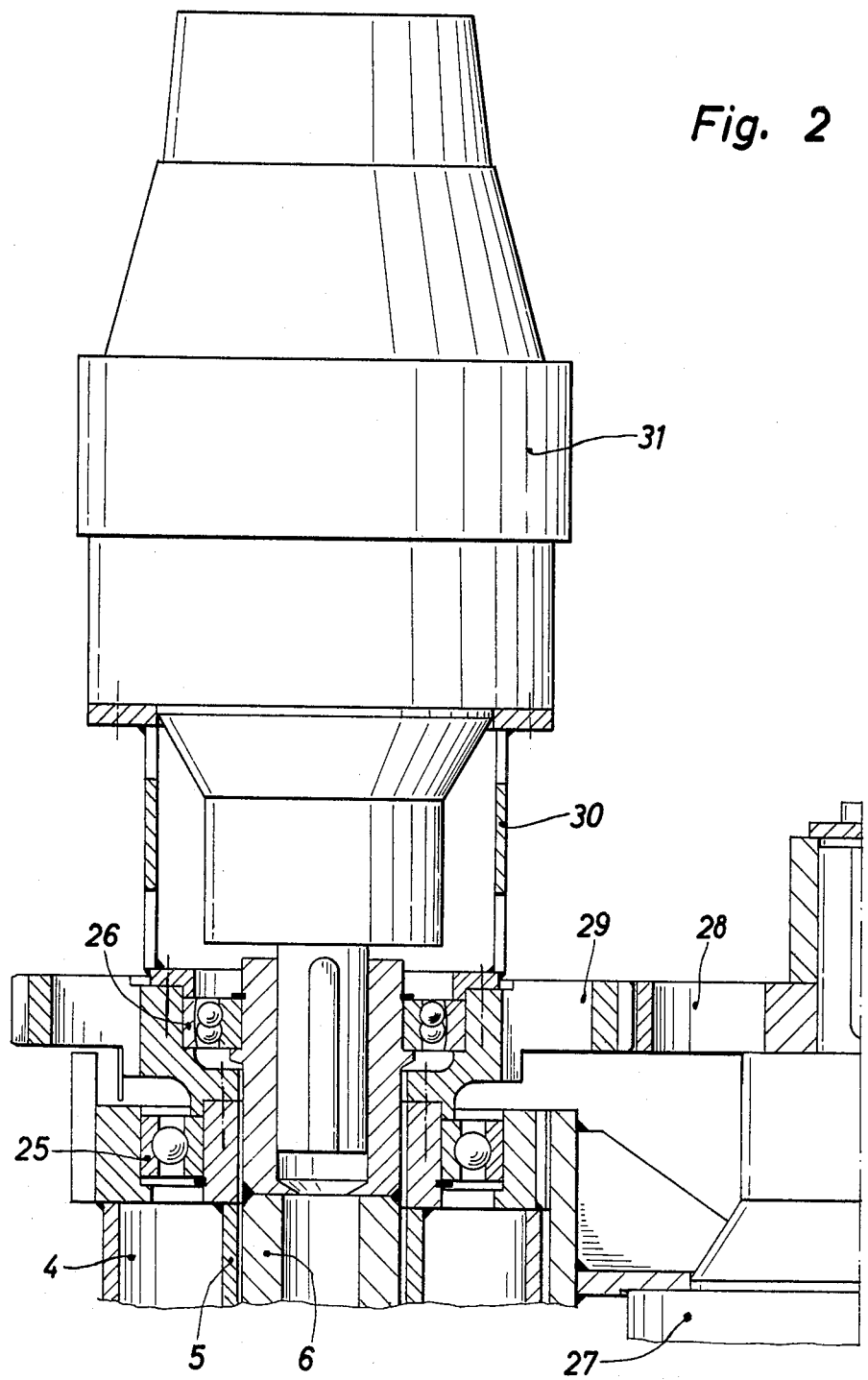
FIG. 2 is a partial view, partly in cross section, through the upper end area of the mounting unit of the resistance welding installation in accordance with the present invention.

Referring now to the drawing wherein like reference numerals are used throughout the various views to designate like parts, an installation illustrated in FIG. 1 which serves for the resistance welding of sheet-metal parts a and b includes a frame structure generally designated by reference numeral 1, in whose pedestal bearing 1' a mounting support 3 is pivotally supported by way of pivot pins 2 defining a pivot axis substantially perpendicular to the upright axis of the mounting support 3 and parallel to the x direction. A mounting unit 4 is arranged in the mounting support 3 longitudinally displaceable and secured against rotation with respect thereto, which carries a half-tong 38 pivotal about all three coordinate axes x, y and z. The mounting unit 4 includes a hollow space, in which a tubular support member 5 is rotatably supported; a drive shaft 6 is also rotatably supported within the hollow space of the tubular support member 5 (FIG. 2). An electric motor 7 mounted at the mounting support 3 is provided for the longitudinal displacement of the mounting unit 4 in the directions of the double arrow z (FIG. 1), whose drive pinion 8 meshes with a toothed rack 9 rigidly connected with the mounting unit 4.

The frame structure 1 consists essentially of a base frame 10 and of support bearers 11 which project from the plane of the base frame 10 in a vertical plane and are connected with each other within the area of the bearing support 1'. One locally fixedly mounted guide rail 12 and 12' each extends within the area of two mutually oppositely disposed longitudinal bearers 10' of the base frame 10, along which the frame structure 1 is guided free of play by means of guide rollers 13. The guide rollers 13 engage at the guide rail 12' in mutually perpendicularly extending planes. An electric motor 14 is locally fixedly mounted near the guide rail 12', whose drive pinion 15 meshes with a toothed rack 16 that is connected with the base frame 10. As a result thereof, the frame structure 1 is displaceable corresponding to the directions of the double arrow x (FIG. 1). An adjusting installation 17 supported in guide rollers 22 is provided at the base of the frame structure 1, which is connected with a guidance 18, in which the mounting unit 4 is guided. An electric motor 19 is mounted at the frame structure 1, whose drive pinion 20 meshes with a toothed rack 21 which is connected with the adjusting device 17 and which displaces the latter in the directions of the double arrow y at right angle to the displacement direction of the frame structure 1. A bracket 32 is secured to the mounting support 3, which carries a pneumatically actuated weight-compensating cylinder 33 whose piston rod 34 is pivotally connected with an arm 35 projecting from the outer surface of the mounting unit 4 and rigidly connected therewith. The weight-compensating cylinder 33 serves for the compensation of the mass forces which become effective in the different pivot positions of the mounting unit 4.

The drive shaft 6 provided in the tubular support member 5 as also the tubular support member 5 arranged in its turn in the mounting unit 4 are each supported by way of a roller bearing 25, 25' respectively 26, 26' (FIGS. 2 and 3). An electric motor 27 is rigidly mounted on the mounting unit 4, whose drive pinion 28 meshes with a gear 29 (FIGS. 1 and 2) which is rigidly connected with the tubular support member 5. A housing 30 (FIG. 2) is mounted end-face at the gear 29, which carries an electric motor 31 that drivingly cooperates with the drive shaft 6. The electric motors 7, 14, 19, 27 and 31 are program-controlled and are each equipped with a transmission gearing, a tachometer, a brake and a transmitter. In lieu of the electric motors, for example, also adjusting motors driven by mechanical energy may be provided.

As is illustrated in FIG. 3, a pivot drive generally designated by reference numeral 39 receiving the half-tong generally designated by reference numeral 38 is provided at the lower end of the tubular support member 5. The pivot drive 39 is rotatably supported in two side plates 40 (FIGS. 1 and 3) projecting end face from the mounting unit 4 and consists of a bevel gear 41 non-rotatably connected with the drive shaft 6 for rotation in unison therewith, which meshes with a spur bevel gear 42 constructed as segment that is rotatably supported in the side plates 40 by way of a pivot shaft 43, as well as of a support arm 45 non-rotatably connected with the spur bevel gear 42 by way of dowel pins 44. The electrode holder 47 is pivotally connected within the area of its rear end at the support arm 45 by way of a joint bolt 46, whereas a welding electrode 48 is inserted into the forward end area of the electrode holder 47. The half-tong 38 consists of the support arm 45 and of the electrode holder 47. The electrode holder 47 is supported at the support arm 45 by way of a spring-force storage device consisting of several cup springs 49. An adjusting screw 50 is screwed into the support arm 45 at its forward end, whose counter-nut 51 cooperates with the top side of the support arm 45 whereas the free end of the adjusting screw 50 projects into the bores of the cup springs 49. The cup springs 49 can be prestressed by means of the adjusting screw 50; an abutment 45' is provided at the bottom side of the support arm 45 which prevents a pivoting of the holder 47 in the direction of action of the cup springs 49.

The welding current is fed to the welding electrode 48 by a contact element generally designated by reference numeral 54 (FIG. 3) provided at the lower end of the mounting unit 4. The contact element 54 includes the following parts (FIGS. 3 and 4):

An intermediate ring 55 connected with the tubular support member 5, a bearing ring 56 screwed together with the intermediate ring 55 end face, from the outer circumference of which projects a screw-on plate 57, to which a contact ring 59 is threadably secured under interposition of an insulation 58. An arcuately shaped abutment 60—which abuts by way of an insert member 61 consisting of insulating material at the surface of the bore 59'—is arranged in the concentric bore 59' of the contact ring 59, and an arcuately shaped contact member 62 consisting of copper is also arranged in the concentric bore 59'. The abutment 60 and the contact member 62 are pivotally connected to one another at their respective ends on a joint bolt 63 which is threadably secured to a fastening bracket 64 which, in its turn, is rigidly connected with the mounting unit 4. Both the abutment 60 as also the contact member 62 are arranged in the bore 59' without metal contact on all sides in relation to the support ring 5 and to the contact ring 59. An insulation 58 is also provided at the outer surface of the pivot bolt 63 and between the abutment surfaces of the abutment 60 and of the contact member 62. The contact member 62 includes a radially projecting rim web 62' extending over a partial area of its outer circumference which is provided opposite the insert member 61. The contact member 62, in case of need, is adapted to be brought into abutment with the contact ring 59 for the formation of an electric current bridge by way of the rim web 62' by means of a single-acting hydraulic cylinder 65 (FIG. 4) supported at the abutment 60. The current bridge or electrical connection is interrupted with a non-actuated hydraulic cylinder 65 by means of a return spring (not shown) by inward pivot movement of the contact member 62. The pressure oil is fed to the hydraulic cylinder 65 by way of a connection 66. Several channels 67 (FIG. 3) extend through the intermediate ring 55, through which the leakage oil of the hydraulic cylinders 65 can flow off to the roller bearing 26' and thereby serves for the lubrication thereof. The contact member 62 is provided at its top side with an electric conductor 68 (FIG. 3) which in its turn is operatively connected with a cable end portion 69 secured at the mounting unit 4. For transmitting the welding current to the welding electrode 48, both the contact ring 59 as also the holder 47 are each provided with a cable connection 70 and 71, respectively, which are connected with each other by way of an electric cable 72.

The contact ring 59 is surrounded by a cooling ring 74 which is provided with cooling medium channels 75. The cooling ring 74 is rigidly connected with the mounting unit 4 by way of the fastening bracket 64. Cooling water is fed into the cooling medium channels 75 from a pump (not shown) by way of the line 76 and from there continues to flow into the holder 47 of the welding electrode 48 by way of the line 77; from there, the cooling water flows by way of the line 78 into the cooling ring 74 and from the latter by way of the line 79 back to the pump. The contact ring 59 is provided with seals 80 which closely adjoin the outer surface of the contact ring 59 by reason of their inherent or residual stress.

The operation of the described installation is as follows:

A fixed copper plate 80 (FIGS. 1 and 3) is provided for the sheet-metal parts a and b to be connected by spot-welding, onto which the sheet-metal parts a and b are clamped. A welding transformer with a rectifier 81 (FIG. 1) connected in its output serves as current source for the installation according to the present invention, from which electric current flows by way of a cable 82 to the copper plate 80 and by way of a cable 83 to the cable end portion 69 of the mounting unit 4. The frame structure 1 and the displacement mechanism 17 are longitudinally displaced by way of a program control of any conventional construction which actuates the electric motors 7, 14, 19, 27 and 31, in the direction of arrow x, respectively, y for the positioning of the welding electrode 48 at the spot-welding place c provided on the sheet-metal parts a and b. The mounting unit 4 is displaced upward or downward by the electric motor 7 in the direction of arrow z for such length of time until the welding electrode 48 is disposed slightly above the surface of the sheet-metal member b. The drive shaft 6 is now rotated by actuation of the electric motor 31, whose driving pinion 41 (FIG. 3) pivots the half-tong 38 downwardly by way of the spur bevel gear 42, as a result of which the welding electrode 48 exerts onto the spot-welding place c a defined controllable welding pressure. The welding pressure can be matched thereby advantageously to the varying sheet-metal thicknesses. A readjustment of the welding electrode 48 at the welding place c is achieved during the welding operation by means of the holder 47 springly supported at the support arm 45. The half-tong 38 is pivotal by the rotatable tubular support member 5 through 360° corresponding to the directions of the double arrow d (FIG. 1) whereas the drive shaft 6 serves for the up or down pivoting of the half-tong 38 in the directions of the double arrow e (FIG. 1). Thus, each welding point at the sheet-metal members to be welded together can be rapidly reached in a controlled manner by means of the installation according to the present invention even if the sheet-metal members are three-dimensionally curved.

Of course, the electric motors 7, 14, 19, 27 and 31 may also be each individually controlled in lieu of being controlled by a program control.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the resistance welding of structural parts, comprising a half-tong means and a welding electrode secured at the half-tong means, characterized in that the half-tong means is arranged for pivotal movement, and characterized by a pivotal mounting means, a tubular support member rotatably supported on the mounting means, the half-tong means being pivotally supported at the end of the tubular support member, a drive shaft having an axis and being rotatably supported in the tubular support member, said drive shaft and said tubular support member each including rotary drive means, and said drive shaft being operable to pivot the half-tong means supported at the end of the tubular support member about an axis extending transversely to the axis of said drive shaft.

2. An installation according to claim 1, characterized in that the installation is for the resistance-welding of structural groups of motor vehicles.

3. An installation according to claim 1, characterized in that the rotary drive means include electric motors.

4. An installation according to claim 3, characterized in that the mounting means is longitudinally displaceable in a mounting support means by means of an adjusting motor, said mounting support means being pivotal in a frame means.

5. An installation according to claim 4, characterized in that the adjusting motor is an electric motor.

6. An installation according to claim 4, characterized in that the frame means is displaceably supported, is displaced in the displacement direction by an adjusting motor and includes an adjusting mechanism having an adjusting motor cooperating with the mounting means, which is operable transversely to the displacement direction of the frame means.

7. An installation according to claim 1 or 6, characterized in that an electric motor is mounted at an end of the mounting means, whose drive pinion meshes with a gear securely connected with the tubular support member.

8. An installation according to claim 7, characterized in that the gear secured at the tubular support member is connected end face with a housing means which carries the rotary drive means for the drive shaft.

9. An installation according to claim 8, characterized in that a pivot drive means holding the half-tong means is provided at one end of the tubular support member.

10. An installation according to claim 6, characterized in that the pivot drive means is rotatably supported in two support plates projecting end face from the mounting means and essentially consists of a bevel gear non-rotatably connected with the drive shaft, with which meshes a spur bevel gear, and of a support arm means rigidly connected with the spur bevel gear, a holder means for the welding electrode being pivotally connected with the support arm means and being supported thereagainst under interposition of at least one spring.

11. An installation according to claim 1 or 10, characterized in that the welding current is fed to a cable end portion mounted at the mounting means, which is operatively connected by way of an electric conductor with a contact means provided at the end of the mounting means, said contact means including an arcuately shaped abutment means that abuts by way of an insert member of insulating material at a contact ring insulatedly secured at the tubular support member and electrically connected with the welding electrode, and an arcuately shaped contact member of electrically conductive material pivotally connected with the abutment means, said contact member being operable to be brought into abutment with the contact ring by way of a single-acting hydraulic cylinder against the action of a return spring.

12. An installation according to claim 11, characterized in that the contact ring is surrounded by a cooling ring means provided with cooling medium channels, whose channels are connected to a cooling medium circulatory system for the half-tong means.

13. An installation according to claim 12, characterized in that the cooling ring means is rigidly connected with the mounting means by way of a fastening bracket, on which is mounted a joint bolt receiving the arcuately shaped abutment means and the arcuately shaped contact member.

14. An installation according to claim 4, characterized in that a weight-compensating cylinder means is mounted at the mounting support means pivotally supported in the frame means, whose piston rod is pivotally connected at an arm projecting from the outer surface of the mounting means.

15. An installation according to claim 1, characterized in that a pivot drive means holding the half-tong means is provided at one end of the tubular support member.

16. An installation according to claim 15, characterized in that the pivot drive means is rotatably supported in two support plates projecting end face from the mounting means and essentially consists of a bevel gear non-rotatably connected with the drive shaft, with which meshes a spur bevel gear, and of a support arm means rigidly connected with the spur bevel gear, a holder means for the welding electrode being pivotally connected with the support arm means and being supported thereagainst under interposition of at least one spring.

17. An installation for the resistance-welding of structural parts comprising mounting unit means positioned in a holder and arranged for movement with respect to the holder, welding tool means disposed with respect to the mounting unit means, the welding tool means including half-tong means, a drive shaft being disposed in the mounting unit means, and a pivot drive for pivoting the half-tong means being interposed between the drive shaft and the half-tong means, the pivot drive being driven by the drive shaft for pivoting the half-tong means.

18. An installation according to claim 17, wherein the pivot drive pivots the half-tong means about a pivot axis extending transversely to the axis of the drive shaft.

19. An installation according to claim 18, wherein a means is provided for enabling pivoting of the mounting unit means about a pivot axis which extends transversely to the axis of the drive shaft.

20. An installation according to claim 19, further comprising a tubular support member rotatably supported in the mounting unit means, the tubular support member being rotatable about an axis extending transversely to the pivot axis of the mounting unit means, the drive shaft being disposed coaxially in the tubular support member.

21. An installation according to claim 20, further comprising electric motor means being mounted at one end of the mounting unit means, the electric motor means having a drive pinion, and the tubular support member having a gear member secured thereto, the drive pinion of the electric motor means being arranged for engagement with the gear member of the tubular support member.

22. An installation according to claim 21, wherein the gear member secured at the tubular support member is connected end face with a housing means, the housing means supporting a rotary drive means for the drive shaft.

23. An installation according to any one of claim 17 or 22, wherein the pivot drive is rotatably supported in two support plates projecting end face from the mounting unit means and essentially consists of a bevel gear non-rotatably connected with the drive shaft, a spur bevel gear being meshingly engageable with the bevel gear, and of a support arm means rigidly connected with the spur bevel gear, the half-tong means including a holder means for a welding electrode being pivotably connected with the support arm means and being supported thereagainst under interposition of at least one spring.

24. An installation according to claim 18, wherein the welding electrode of the half-tong means is operably connected by way of a flexible electrical conductor with a rotatable contact means, the rotatable contact means being arranged at the lower end of the mounting unit means.

25. An installation according to claim 24, wherein welding current is fed to a cable end portion mounted at the mounting unit means, the cable end portion being connected by way of an electric conductor with the contact means, the contact means including an arcuately shaped abutment means that abuts by way of an insert member of insulating material at a contact ring insulatedly secured at the tubular support member and electrically connected with the welding electrode, and an arcuately shaped contact member of electrically conductive material pivotally connected with the abutment means, the contact member being operable to be brought into abutment with the contact ring by way of a single-acting hydraulic cylinder against the action of a return spring.

26. An installation according to claim 25, wherein the contact ring is surrounded by a cooling ring means provided with cooling medium channels, the cooling medium channels being connected to a cooling medium circulatory system for the half-tong means.

27. An installation according to claim 26, wherein the cooling ring means is rigidly connected with the mounting unit means by way of a fastening bracket, on which is mounted a joint bolt receiving the arcuately shaped abutment means and the arcuately shaped contact member.

28. An installation according to claim 19, further comprising a weight-compensating cylinder means mounted on the holder, the holder being pivotally supported in a frame means, the weight-compensating cylinder means having a piston rod pivotally connected at an arm projecting from the outer surface of the mounting unit means.

* * * * *